May 19, 1953 M. H. DUVAL 2,638,685
METHOD AND APPARATUS FOR CONDITIONING BAKED PRODUCTS
Filed May 24, 1948 8 Sheets-Sheet 4

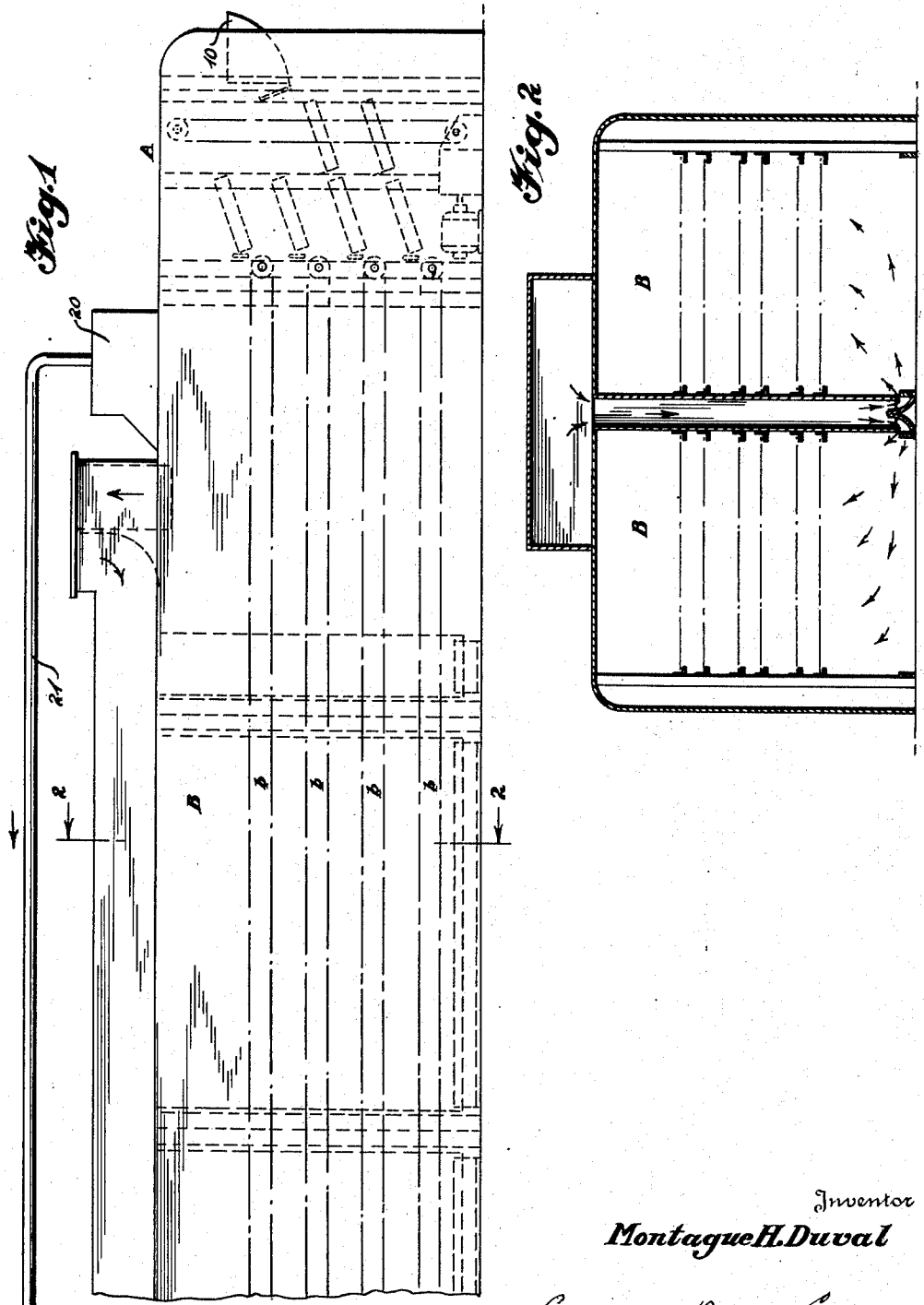

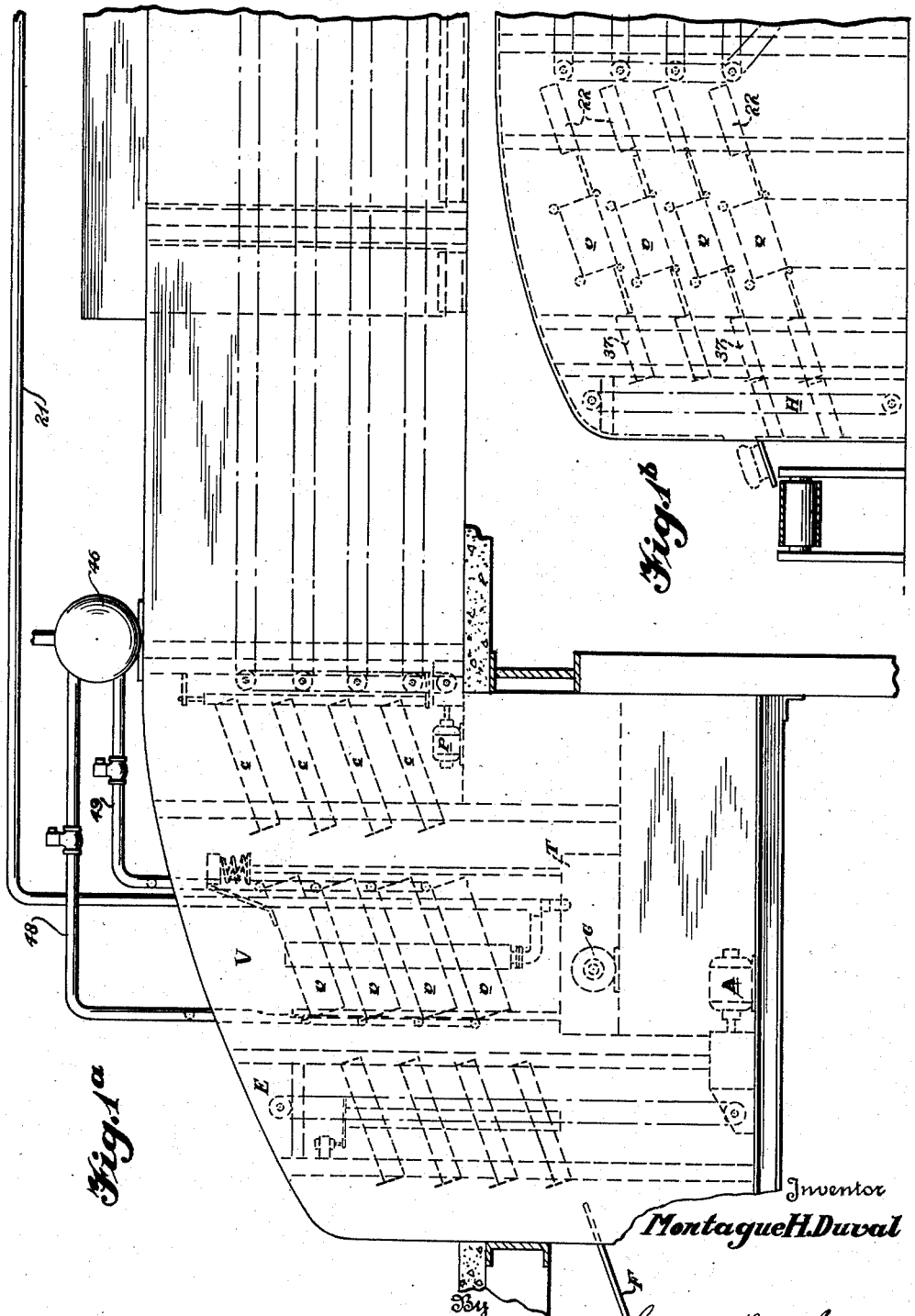

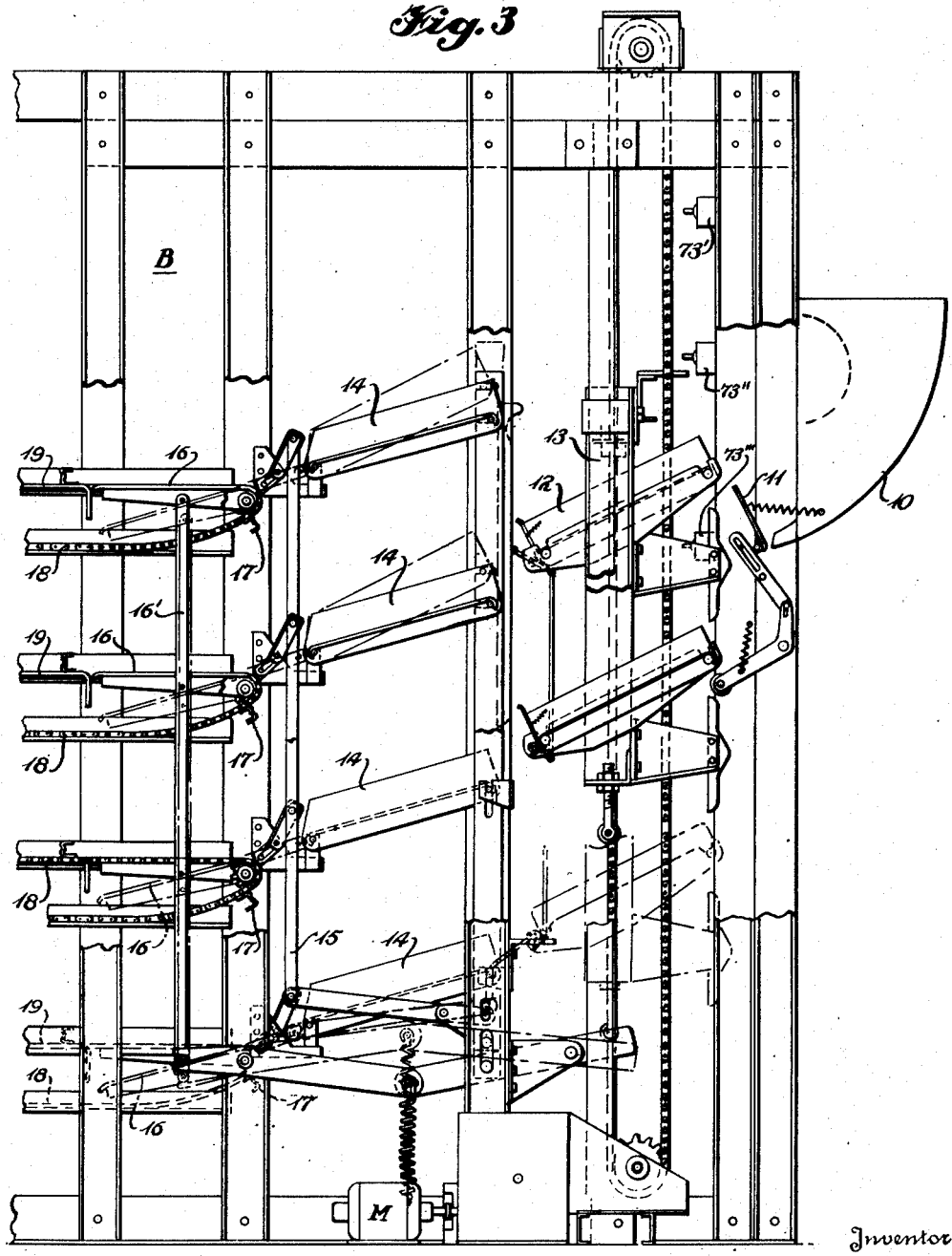

Inventor
Montague H. Duval
By Cushman, Darby & Cushman
Attorneys

May 19, 1953    M. H. DUVAL    2,638,685
METHOD AND APPARATUS FOR CONDITIONING BAKED PRODUCTS
Filed May 24, 1948    8 Sheets-Sheet 5
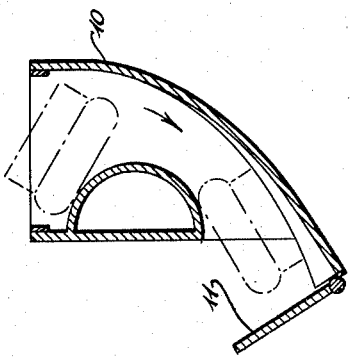
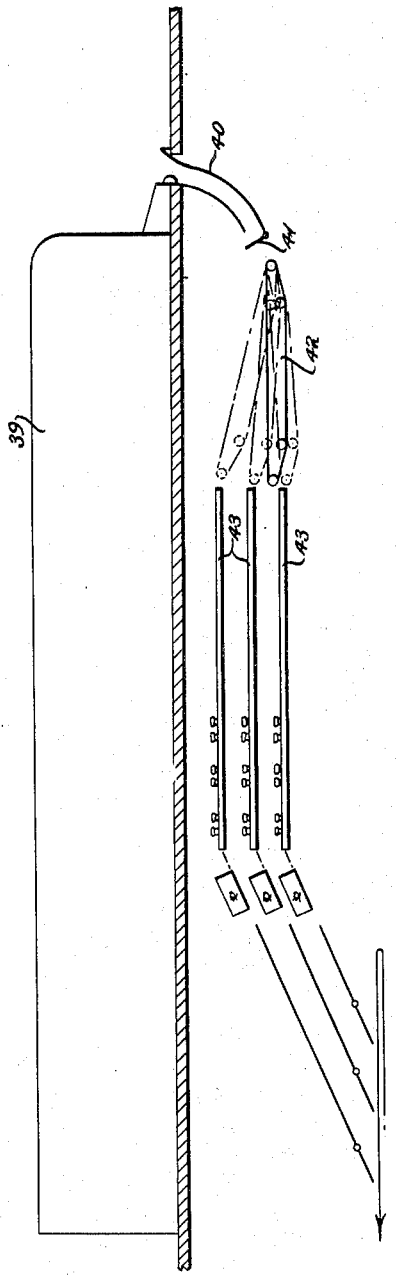
Inventor
*Montague H. Duval*
By Cushman, Darby & Cushman
Attorneys

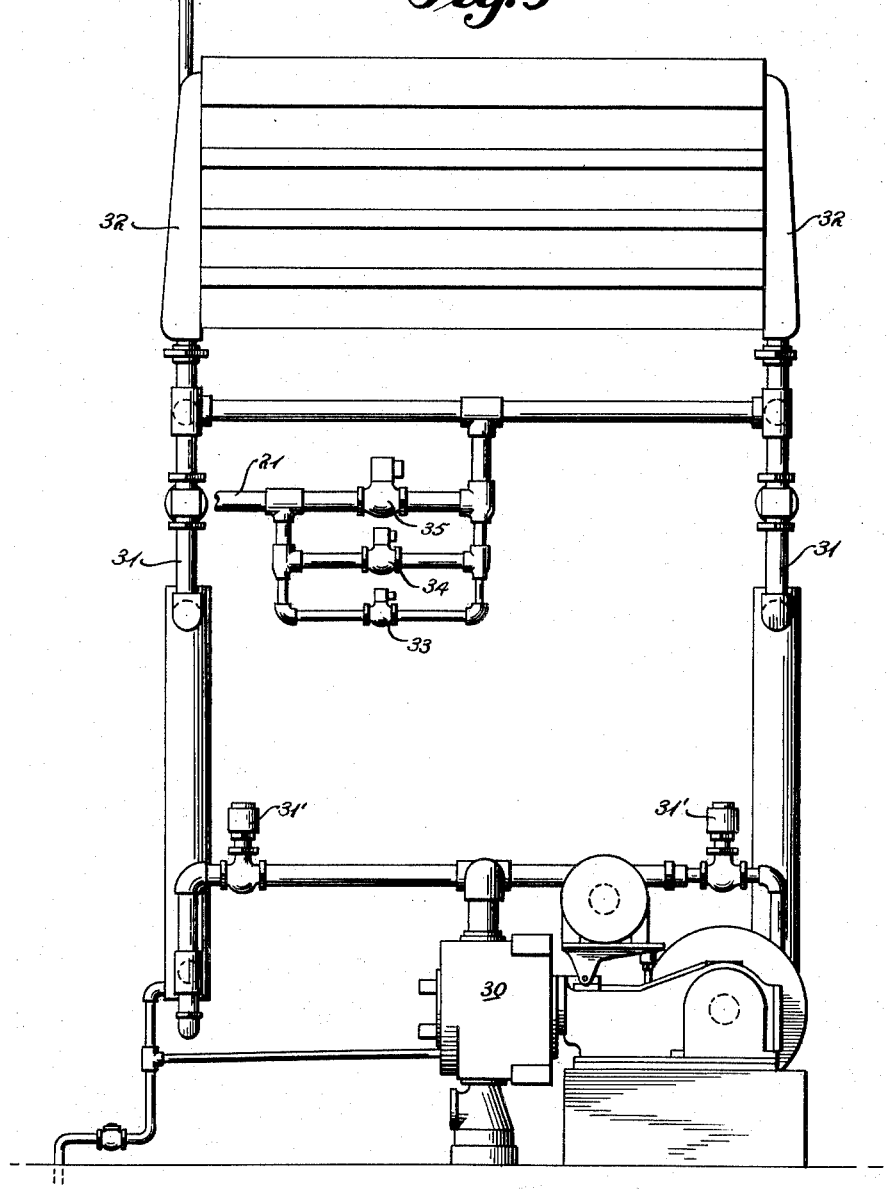

May 19, 1953   M. H. DUVAL   2,638,685
METHOD AND APPARATUS FOR CONDITIONING BAKED PRODUCTS
Filed May 24, 1948   8 Sheets-Sheet 7
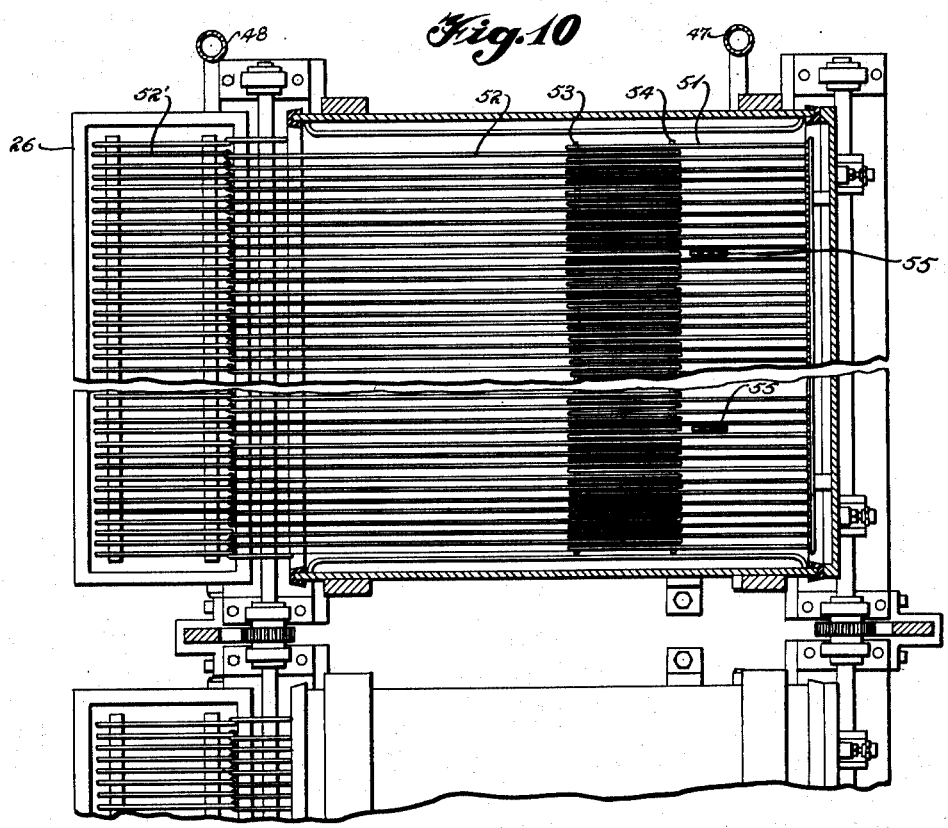
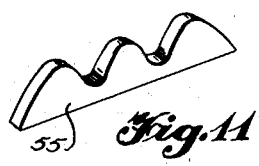
Inventor
Montague H. Duval
By Cushman, Darby & Cushman
Attorneys May 19, 1953 M. H. DUVAL 2,638,685
METHOD AND APPARATUS FOR CONDITIONING BAKED PRODUCTS
Filed May 24, 1948 8 Sheets-Sheet 8
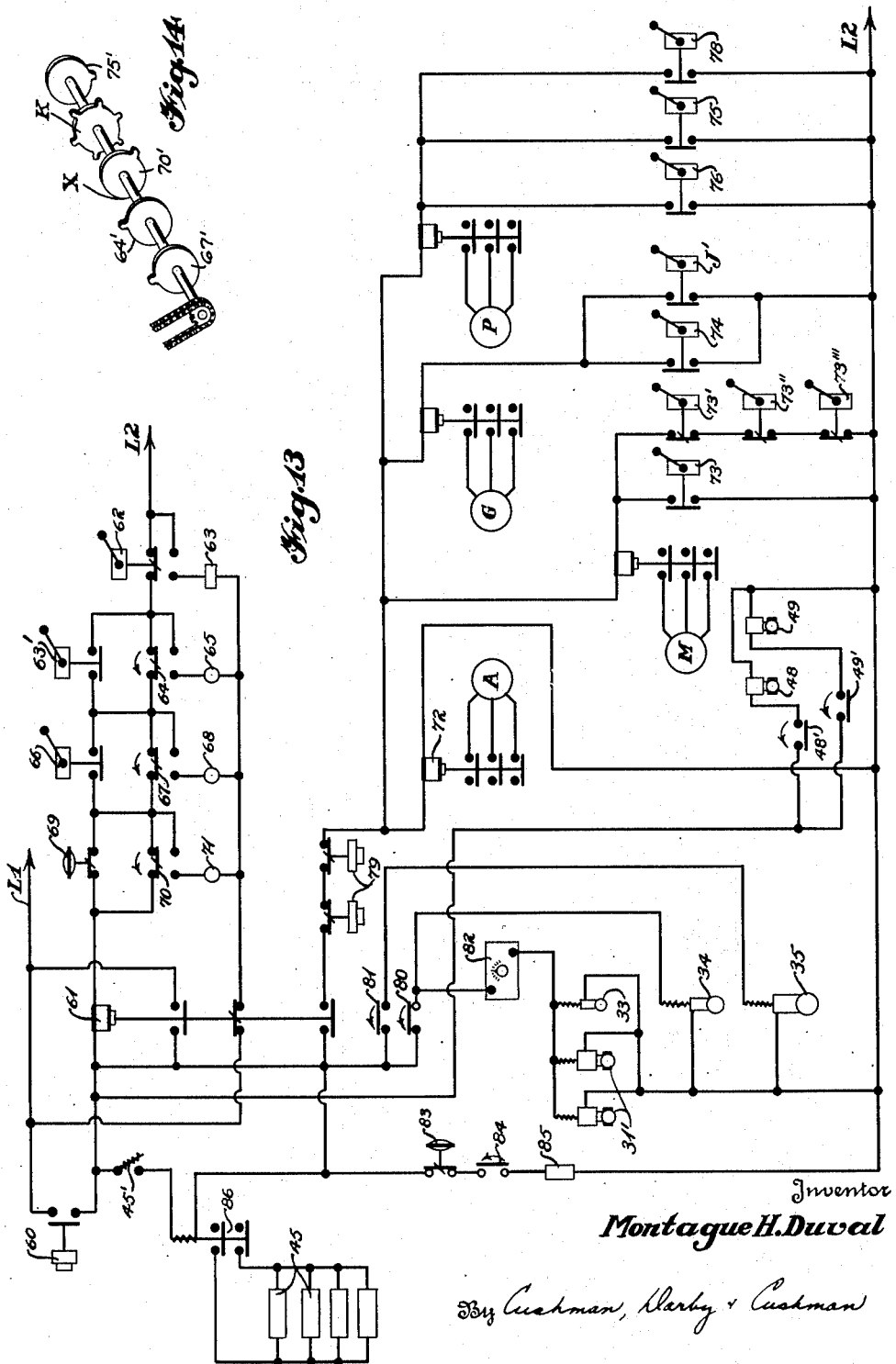
Inventor
Montague H. Duval
By Cushman, Darby & Cushman
Attorneys Patented May 19, 1953

2,638,685

UNITED STATES PATENT OFFICE 2,638,685

METHOD AND APPARATUS FOR CONDITIONING BAKED PRODUCTS

Montague H. Duval, Westport, Conn.

Application May 24, 1948, Serial No. 28,878

20 Claims. (Cl. 34—15)

This invention relates to a method and apparatus for the cooling and conditioning of baked products, notably bread, and reference is made to my United States Patents Nos. 2,072,737, 2,171,921, and 2,171,922 which are here incorporated as a part of this disclosure.

The invention comprises a method which is carried out automatically in a line to which goods are continuously delivered from an oven and conditioned, cooled and discharged ready for slicing, wrapping, or other operations.

The continuous method comprises separating the products at a single receiving point into groups, e. g., of four, ten, sixteen, twenty-four, or any other suitable number of loaves of bread each, and then distributing the respective groups successively by transferring each group from the separating point, in rotation, to one of a plurality of independent paths of a tempering zone. The groups of units are carried through the tempering zone along the paths therein to permit moisture to travel to the surfaces of the units and reduce the temperature at the surfaces of the loaves as the units travel through the zone, whereby the surfaces and adjacent surface zones of the baked units are softened and made moist and of lower temperature than their interiors defined by the surface zones. After such tempering treatment, the groups are transferred to a vacuum cooling zone where they are treated under a controlled pressure in which the boiling point of water does not vary sufficiently from the temperature of the crust as to substantially alter the crust from its softened tempered condition.

The latter treatment according to my previous disclosures has always interposed the problem that the vacuum cycle (which includes a time period of about 1½ to 3 minutes required to open the doors of the vacuum chamber, close the same, produce the necessary vacuum and release the pressure) is considerably longer than the 12 to 25 seconds required to separate and distribute each group to the tempering zone. This discrepancy in operation times has mitigated against automatic feeding and also has precluded high speed conditioning and cooling of baked products, especially where large oven output has to be handled.

I now have found, particularly when large oven output has to be handled, that by charging the groups in multiples of two or more to the vacuum zone, the aforesaid difficulty is solved and a continuous line may be provided which will accommodate the load from practically any oven, e. g., 5,000 or 6,000 loaves per hour or more. Following this procedure, the difference between the separation time and the transfer time to the tempering means, on the one hand, and the vacuum cycle time, on the other hand, is, for all practical purposes, eliminated, and a high speed operation is maintained until the treatment of an entire load from the oven is completed.

Moreover, and of particular importance, notwithstanding that a high speed distributing and transferring means is utilized, or that a tempering time of 15 to 40 minutes may be required, or that a vacuum cycle of not less than 1½ minutes is employed, (1) a relatively small compact line can be installed in a minimum of space in a bakery, and (2) the whole operation may be conducted without resorting to any manual operations after the bread has been delivered to the line.

Another feature of the invention includes preventing condensation of moisture on the walls of the vacuum zone during the vacuum cooling. That is, the temperature of the metal walls of the vacuum zone is always maintained at a point above the dew-point of vapors leaving the baked products at the end of the vacuum cooling step. This step is of importance in the process for several reasons. If condensed vapors withdrawn from the bread during the vacuum cooling step are permitted to remain upon the inside walls and the doors of the vacuum zone at the conclusion of vacuum treatment, there is a tendency for the bottoms of the baked products to stick and thereby not discharge readily when desired. Also, unless the metal is maintained at a proper temperature, residual condensation will build up and trickle across the gaskets on the discharge side of the vacuum zone so that crumbs will stick to same and impair the seal necessary to successful operation of the process on a continuous basis. Further, if undue condensate is permitted to build up during the vacuum cooling step, it may drop from the roof of the vacuum zone onto the surfaces of the baked products, and any accumulation of residual condensate will eventually run across the lower portions of the vacuum zone and drop upon baked products as they are discharged from same, thereby impairing the quality of the product.

A further feature of the invention includes creating a vacuum in excess of 28 inches in the vacuum zone and releasing such vacuum initially at a relatively slow rate until the pressure has dropped to between 20 and 26 inches and thereafter releasing the vacuum at a substantially unrestricted rate. In this manner, pressure is permitted to build up within the vacuum treated products without undue stress being exerted upon the surfaces thereof such as might distort the configuration of a loaf or affect its quality. Also, this step has the advantage of reducing the time period required to complete the vacuum cycle.

The invention comprises a method for automatically preventing the accumulation of crumbs adjacent the charging and discharge doors of the vacuum zones so as to assure a proper seal and reduce wear of the door gaskets and also assure that there will be no obstacles to free charging and discharging of baked goods in the vacuum zone.

A method is also provided to insure rapid discharge of the evacuated products from the vacuum zone upon completion of the vacuum cycle.

The feeding means, the tempering means, and the vacuum treating means are operated automatically in timed relation. This is to give great flexibility and adjustability of operation and insure continuous travel of baked goods through the line under varying conditions, such as the rate of oven delivery and the nature of the baked goods to be treated may call for.

Means are further provided for automatically stopping the machine should any of the instrumentalities cease to function properly, and means are likewise provided for indicating to an operator the location of the particular mechanism which is producing the failure. In addition, means are provided for preventing the resumption of operations until the mechanism causing the failure has been repaired.

The control means include a connection between the separating and distributing instrumentality and the vacuum zone whereby these several operations are synchronous, and a specific relationship is maintained between the rate of feeding the separated groups into the apparatus and the duration of the vacuum cycle. In the event any malfunction occurs in the tempering or vacuum portions of the process, causing the controls to stop the machine as described above, the feeding and distributing means also stop instantaneously without any dislocation occurring in the synchronous relationship of the entire mechanism. Further, if it becomes desirable to either increase or decrease the duration of the vacuum cycle, the feeding means will automatically increase or decrease its rate of operation to correspond with the desired relationship to the vacuum cycle. In this way, where a given even output has to be handled, the most desirable vacuum cycle time is first decided upon (approximately two minutes optimum) and the rate of segregating the groups from the oven is then decided upon, and also the number of flights to which the feeding and distributing means will deliver these separated groups. Once this relationship has been established, the controls of the entire mechanism maintain them in synchronous relationship, as above described.

Referring to the drawings:

Figures 1 and 1a illustrate diagrammatically one form of continuous automatic line for conditioning and cooling baked products;

Figure 1b is a modification of that part of the line shown in Figure 1a;

Figure 2 is a sectional view showing the tempering zones of a pair of lines arranged side-by-side and the manner in which air of desired humidity and temperature may be introduced to such zones;

Figure 3 is an elevational view of one form of means for separating baked products as delivered to the line into groups containing a specified number of units and distributing the same to the tempering zone, all of the groups being distributed to the respective paths of the tempering zone simultaneously;

Figure 4 is a sectional view of a turn-over chute showing the same in detail with its gate or releasing member;

Figure 5 is an elevational view of one form of the invention at the opposite end of the tempering zone from that shown in Figure 3 embodying a method for introducing multiple groups into each vacuum chamber, means for operating the doors of the vacuum chambers and an elevator for receiving the products discharged from the vacuum chambers and distributing them to a chute or conveyor;

Figure 5a is a diagrammatic view of another form of the invention wherein the distributing means successively transfers the baked products to the paths of the tempering zone and embodying another manner of charging the vacuum chambers with multiple groups;

Figure 6 is a detailed view of one of the trays carried by the elevator of Figure 5;

Figure 7 is a fragmentary view illustrating in top elevation the manner in which the trays of Figure 6 are operated to discharge baked products upon a conveyor or chute;

Figure 8 is a detail plan view of the rotating switch shown in Figure 5;

Figure 9 is an elevation of the vacuum-inducing apparatus and showing the manner in which the method of releasing the vacuum is carried out so as to provide for a gradual release of the negative pressure in the vacuum chambers after the vacuum treatment;

Figure 10 is a plan view partly in section and partly in elevation of one of the vacuum chambers showing the manner in which the gravity removal of the baked products is facilitated by agitating the grill on which the products are supported.

Figure 11 is a perspective view of one of the members employed for agitating the grill as described in connection with Figure 10;

Figure 12 is a sectional view of one of the perforated pipes employed for blowing air upon the sealing surfaces of the vacuum chamber and doors when the doors are opened whereby to assure that accumulation of crumbs will be prevented;

Figure 13 is a wiring diagram of the controls for the machine; and

Figure 14 is a diagrammatic view of cam means for use with the wiring circuit, which cam means are mounted on the same shaft (as cam K, Figure 5).

Referring to Figures 1 and 1a, there is illustrated diagrammatically one form of the complete automatic line. This line embodies the feeding apparatus A, the tempering zone B having a plurality of paths b, including the transfer means c, the vacuum zone V preferably having one vacuum chamber v for each path, and the discharge transfer E. All of the operations are automatically carried out continuously in timed sequence and human hands do not touch the baked products from the time they are delivered to the turnover chute 10 shown specifically in Figure 4 throughout the subsequent operations.

Referring to Figures 2 and 10, it is desirable in many instances to operate two lines of apparatus side-by-side.

Referring particularly to Figures 3 and 4, the turn-over chute is provided with a gate 11 for discharging a group of baked units, for instance, four or more loaves of bread each time the gate is released. Each group is delivered to a transfer tray 12, there being preferably two such trays carried by an elevator 13. In the upward movement of the elevator, the gate is successively tripped to release a group to each of the trays 12, which groups are then delivered to the upper pair of collector trays 14. On the downward movement of the elevator 13, groups are similarly successively delivered to the transfer trays 12 by release of gate 11, and respectively transferred by such trays to the lower pair of collector trays 14. A tie rod 15 is reciprocated and its pulled-down position acts to simultaneously release the groups from each of the collector trays 14 to a transfer mechanism, including plates 16 which, in turn, are raised by tie rod 16', the latter also being reciprocated, to raise the loaves so that they are engaged by the pusher bars 17 carried on chains 18 and thereby are transferred upon the grills 19 in the tempering zone or chamber B. The pusher bars move the groups over the grills along the paths of the tempering zone.

There is introduced to the tempering zone B air of any desired humidity and temperature, the same being preferably circulated, as indicated by the arrows in Figure 2. A hood 20 is provided in the top of the tempering zone adjacent the feed end thereof and connected with the vacuum chambers by a line 21 whereby fresh bread odors and vapors produced in the tempering zone are injected into the bread at the conclusion of the vacuum treatment to bring the vacuum chambers to a pressure equal to that of the atmosphere before the bread is discharged.

At the opposite end of the tempering zone and referring to Figure 5, the tempered bread may be delivered to transfer trays 22 having gates 23. A plurality of superposed vacuum chambers $v$ is provided having charging doors 25 and discharging doors 26. The charging doors are opened and closed by the reciprocating action of the tie rod 27, and in their open position, the lowermost door engages a projection 28 which pulls down on the tie rod 29 mounted for reciprocation and to which the gates 23 are connected. This releases the bread held in the transfer trays 22 which moves across the bridge provided by the charging doors 25 and the gates 23 into the respective vacuum chambers.

Thereafter the doors 25 are closed and the vacuum-inducing apparatus immediately starts to create a reduced pressure in the vacuum chambers which is continued until 28 inches of vacuum or more have been obtained. The vacuum-producing means is shown in Figure 9, and includes the pump 30 which withdraws air from the vacuum chambers through the line 31 associated with the headers 32 connected to the respective vacuum chambers. When the desired vacuum has been created, the pump is disconnected from the vacuum chambers by closing of valves 31' and valves 33, 34 and 35 are then consecutively opened. The smallest valve 33 opens first to permit introduction of air from the tempering zone through the line 21 to the vacuum chambers and thereafter the larger valve 34 opens to permit a greater ingress of air and when the pressure has dropped in the vacuum chambers to about 20 to 26 inches, the large valve 35 also opens to permit rapid flow of air into the vacuum chambers. In this way, pressure is permitted to build up with the products in the vacuum chambers without undue stress being exerted upon the surfaces thereof. When the pressure in the vacuum chambers is substantially equal to outside pressure, the discharge doors of the vacuum chamber are opened by pulling down on the tie rod 36 which is reciprocated and to which they are connected, the charging doors remaining closed, whereupon the bread passes over the path or bridge provided by the discharge doors into the delivery trays 37. The delivery trays are provided with gates 38, as shown in Figure 6, which are opened in any suitable manner as by a cam track 38' for delivering the bread to a chute or conveyor leading to the slicing or wrapping machinery or other operation.

In the form shown in Figures 1a and 5, these trays are mounted on an elevator and discharge the bread as each tray comes into line with the chute or conveyor F.

In the form shown in Figure 1b the trays 37 are fixed and deliver to an elevator H which, in turn, distributes to the chute or conveyor.

Immediately after the discharge of the bread to the delivery trays 37, the discharging doors are returned to closed position at which time the charging doors are opened. At this point, by reason of the timing of the operations in the line, one or more groups of bread will have been detained in each transfer tray 22 and immediately the gates 23 of such trays are opened as above described, such groups will move into the vacuum chambers by gravity. At this point also, by reason of the timing, one or more groups will pass from the conveyors or paths into each transfer tray 22 and thence into the vacuum chambers immediately following the first groups delivered thereto. Thereupon, the charging doors will close and the vacuum operation continue as described. It will be seen that the vacuum treatment is conducted upon multiple groups of bread and in this manner continuous feeding may be conducted at any desired rate. The vacuum cycle, namely, the time period required to open and close the charging and discharging doors, create the desired vacuum and release same will not be less than 1½ minutes which, of course, is considerably more than the time required to separate the products at the turn-over chute 10 and distribute and transfer them to the conveyor paths of the tempering zone.

The limitation on minimum vacuum cycle time is due to the fact that baked products cannot be satisfactorily subjected to vacuum if the vacuum is created too rapidly. Such rapid treatment may cause the cellular texture of the products to be expanded, and either impair or destroy the quality of same, depending upon the rate of excessive evacuation. Similarly, release cannot be effected too rapidly in the high vacuum range, since the sides of the products may be distorted, causing them to crush in the subsequent slicing and wrapping operation. However, once a reasonable pressure has built up within the products, air may be introduced at a fairly rapid rate. For this reason I use my method of graduated rate of release, and thereby effect complete release in a much shorter time than would be possible if all release were effected at the initially slow and safe rate, and at the same time avoid distortion of the products.

I have therefore found, taking all the foregoing factors into consideration, that a relationship exists between the time of releasing each successive group from the turn-over chute, with the number of paths in the tempering zone, and the actual vacuum cycle time. For example, if successive groups are released from the turn-over chute 10 every 14 seconds, and four paths are provided in the tempering zone, this would provide a set of separated groups ready for vacuum treatment every 56 seconds, e. g., 4×14 seconds. Since this time period is less than 1½ minutes, it is necessary to withhold one such set of separated groups at the discharge end of the tempering zone, and to provide vacuum treating facilities capable of treating two such sets of groups at one time. In this instance, the two sets of separated groups will require vacuum treatment in 112 seconds (2 times 4×14 seconds, or 1 minute, 52 seconds) or a sufficient period to permit satisfactory vacuum treatment without distortion of the baked products.

However, if the release of each successive group from the turn-over chute 10 occurs, let us say, every 21 seconds, three paths may be provided in the tempering zone, resulting in a set of separated groups being delivered from the discharge end of the tempering zone every 63 seconds (1 minute, 3 seconds). Again, in this case, two such sets of separated groups would be treated in the vacuum zone at one operation, resulting in a vacuum cycle time of 2 minutes, 6 seconds.

The above gives two examples upon which a formula relationship is based as between the rate of separating the groups at the turn-over chute, the number of paths in the tempering zone, and the total vacuum cycle time in which such continuous automatic operation can be successfully effected. For purposes of establishing this formula, P is used to represent the time interval between each successive release of separated groups from the turn-over chute, F is the number of multiple flights within the tempering zone, and VC is the total vacuum cycle time. Thus, from the examples above given, it will be seen that 2(F×P)=VC. This formula may now be applied to any volume of oven output, which controls the factor P or rate of operation of the turn-over chute gate, combined with the most suitable number of paths (F) within the tempering zone to arrive at a value VC for the total vacuum cycle time, according to the most desirable condition of operations for the particular installation. It is obvious that any undue increase of the vacuum cycle time beyond 2 or 2½ minutes will merely represent a waste of time, since the process can be effectively and efficiently carried out in a period of 1½ minutes or slightly more.

Hence, in cases where large oven output is to be handled, it will be observed that the discrepancy between the time period of the vacuum cycle and the rate of feeding to the tempering zone is dissipated since the collection of at least one group in each of the trays 22 is at the same rate of speed as the groups are fed to the tempering zone and the transfer of subsequent groups from each path is likewise at the same rate of speed as they are fed to the tempering zone. The movement of the bread through the tempering zone, whethehr the chains 18 are operated continuously or intermittently, is at the same rate as that at which the respective groups are fed to the tempering zone. By holding at least one group in each of the transfer trays 22 so that it is available for charging to the vacuum zone and having at least one group reach the transfer trays 22 and immediately follow the charging of the detained groups into the vacuum chambers, I have solved the problem of automatic feed of the baked products to the continuous line, especially where a large volume has to be handled.

Referring to Figure 5a, I have shown another type of feeding means wherein bread is delivered from the oven 39 to a chute 40 having a gate 41 which releases a group of loaves periodically to the distributing conveyor 42. This conveyor is pivotally mounted so that it can deliver a group successively to each of the paths 43 of the tempering zone. Otherwise the operation is similar to that previously described.

Referring further to Figure 5a, the vacuum treatment of multiple groups may also be accomplished by having the pusher bars 17 move one, two, or more groups of products consecutively direct from the tempering paths into the vacuum zone. In this case, the doors of the vacuum zone form bridges between the ends of the tempering paths when said doors are in open position, and single or multiple groups are pushed directly onto these bridges by the pusher bars 17 and pass by gravity into the vacuum zone, as shown in Figure 5a.

It will be also noted that the operation in Figure 5a includes three tempering paths while the operation in Figures 1 and 1a includes four such paths. Any desired number of paths are used, the feeding means being suitably modified to accommodate such variation and preferably a separate vacuum chamber or zone is provided for each tempering path.

It will be observed that the baked goods such as bread are received from the oven as a single layer and automatically separated and distributed as a multiplicity of layers, are tempered and vacuum-treated, whereupon the groups are reunited into a single layer upon the discharge chute or conveyor.

Referring to Figure 5, each of the vacuum zones is provided with heating means 45. The heating means are thermostatically controlled and maintain the walls and doors of the vacuum chamber at a temperature which will preclude condensation from remaining upon the surfaces of the metal at the time the doors are opened. While I have shown strip type electrical resistance heaters 45, other suitable heating means may be utilized and, in fact, hot air may be blown over the walls of the vacuum chambers from any suitable source to preclude condensation within the vacuum zone.

Referring further to Figure 5, and also to Figure 1a, a pressure tank 46 is provided from which lead the lines 48 and 49. These lines have branch pipes provided with perforated openings 50, as shown in Figure 12, adjacent the doors 25 and 26 of the vacuum chambers v and immediately these doors start to open, air under pressure issues from the openings 50 to drive out any crumbs about the door openings. In this manner the vacuum chambers may be always sealed by the doors, and there will be a minimum of wear on the gaskets. Furthermore, there will be no accumulation such as would retard the introduction of bread to the vacuum chambers and the discharge therefrom. It will be noted that the maintenance of a condition wherein undue condensation is prevented within the vacuum chamber, also aids in preventing the accumulation of crumbs and will assure that they will not stick.

Referring to Figure 10, the bottom of each vacuum chamber is provided with a grill composed of longitudinally extending rods 51 and 52, the end portions of which overlap within the chamber, as shown. The baked products are slidably supported on such grill structure as in the case of the grill structure of the paths of the tempering zone. The rods 52 are connected to similar rods 52' carried on the discharge door 26. The overlapping ends of the rods 51 and 52 are connected to cross members 53 and 54, respectively. A pair of corrugated members 55, as shown in Figure 11, is disposed in the bottom of the chamber and when the discharge door is closed, the cross member 54 engages in one of the valleys of each of the members 55. Consequently, when the discharge door 26 is opening, the rods 52 are drawn forward by the rods 52' and the cross member 54 is drawn across the corrugated surfaces of the members 55 to agitate the bread, and in that manner facilitate its discharge by gravity from the vacuum chambers.

In referring herein to the conditions of vacuum, it is to be understood that I mean measured in inches of mercury.

With respect to the graduated release of vacuum as described herein, the initially slow rate of release from an excess of 28 inches of mercury to approximately 20 to 26 inches of mercury is accomplished in from 5 to 15 seconds.

Referring to Figure 13, a form of electrical control is shown, such that synchronization of the various instrumentalities will be maintained at all times, yet which will also be operative to stop the entire apparatus if the functions are not correctly carried out. The function of this control circuit is partly governed by a bank of rotating cams, the general type and arrangement of which are shown diagrammatically in Figure 14 at X. The cams themselves may be located on any suitable rotating shaft of the mechanism and in Figure 5 are shown as attached to a shaft driven by motor A, which controls the motion of elevator E. For clarity only one cam K is designated, but all other cams indicated in Figure 14 may be mounted upon the same shaft.

A main starting switch which may be located on the structure or at any desired remote point, is indicated at 60 in line L1, and causes the master control circuit to be energized. So long as this master control circuit remains uninterrupted, the operations will be carried out synchronously and in their intended sequence. If any functional failure occurs to cause interruption of the master control circuit, the entire apparatus shuts down automatically and remains shut down until the cause of the trouble has been remedied.

It will be seen that switch 60 brings about energization of control relay 61, assuming that the other source of current from line L2 is complete through the various control switches shown in the diagram. These control switches function as follows. Numeral 62 indicates a conventional double-throw limit switch of the type shown in the patent to Backscheider, No. 1,229,570, June 12, 1917, which is positioned within or adjacent to conveyor drive mechanism 90 (Fig. 5) which also includes any well-known type friction device, such that if any obstruction occurs to prevent the conveyor mechanism from moving freely for the purpose of delivering tempered products to the vacuum chambers, e. g., in the event an overload condition occurs within the tempering zone, switch 62 will break contact across its normally closed poles, and thereby interrupt the energization of main control relay 61. This will cause all operations to stop immediately, in a manner to be subsequently described. When switch 62 breaks contact as described, it brings about contact across its opposed normally open contacts, thereby completing a circuit through any suitable warning device 63, which may be a light or a buzzer, or both, thereby indicating to the operators the cause of failure. It will be seen that energization of control relay 61 cannot be reestablished until the cause of trouble at switch 62 has been determined and corrected.

In similar manner, switch 63' (also shown in Fig. 5) is so arranged that it completes contact across its terminals each time the charge doors 25 are fully opened. At this point in the cycle, cam 64' indicated in Figure 14 reaches a position where it momentarily interrupts the passage of current through switch 64, thereby making the passage of current dependent for a brief interval upon switch 63'. It will be seen that if the charge doors 25 have failed to open at the correct time, there will be interruption of current to control relay 61 and all operations will stop. However, if the doors are opened correctly and have completed a circuit through switch 63', control relay 61 will remain energized, and operations will continue normally. As in the previous case, whenever rotating switch 64 breaks circuit across its normally closed contacts, it completes circuit across its normally open contacts, and in event of any operational failure, causing relay 61 to drop out, warning device 65 would become energized, for purposes of assisting the operators in locating the source of trouble.

In similar manner, discharge door actuated switch 66 (also shown in Fig. 5) and rotating switch 67, cooperate to check the correct operation of discharge doors 26 and are similarly arranged so that warning device 68 would become energized in event the discharge doors fail to open. Cam 67' (Figure 14) is set to open the contacts of switch 67 at the time the discharge door should be open.

A further control is indicated by vacuum switch 69, which may be located in any suitable position such that it is subjected to the vacuum conditions existing within the vacuum pockets. Being of normally closed type, switch 69 opens its contacts whenever any appreciable degree of vacuum exists within the vacuum zone, about three inches or more. It will be seen that the doors of the vacuum zone cannot be opened if any appreciable vacuum exists within the pockets, since the external pressure of the atmosphere would preclude the same, and serious damage would occur to the door operating mechanism if this should happen. Therefore, cam 70' is so set that it interrupts the circuit through line L2 through switch 70 at a point in the cycle just prior to the opening of the doors. The circuit through L2, therefore, becomes dependent upon a circuit through switch 69 and if, for any reason, the vacuum within the chambers has failed to release completely, there will be an interruption of circuit to control relay 61, causing stoppage of the entire operation. Warning device 71 would become energized in such case.

Further desirable control circuits may be arranged in similar manner to those already described, to function in exactly the same way and cause deenergization of control relay 61 in event of any malfunction.

Referring now to the effect of energization or deenergization of control relay 61, it will be seen that it is provided with two sets of normally open contacts and one set of normally closed contacts. The purpose of the normally closed contacts is to effect completion of circuit from L1 through the warning devices 63, 65, 68 and 71 in event relay 61 drops out for any control failure, as previously described.

The upper pair of normally open contacts of relay 61 form a holding circuit from line L1 direct to the coil of the relay itself, as soon as the latter has been energized by operation of main switch 60. In other words, one switch 60 has caused energization of control relay 61, it will remain energized until and if some interruption of line L2 occurs for control reasons described above.

The lower set of normally open contacts of control relay 61, when the relay is energized, provides a source of current from line L1 to the motors and controls operating the synchronous functions of the mechanism. It will thus be seen that any interruption of current to relay 61 will immediately cause line L1 to be disconnected from all motors, and thereby bring about stoppage.

Assuming control relay 61 to be energized, this causes energization of relay 72, which in turn energizes motor A (Fig. 5) and the elevator mechanism for the discharge end of the apparatus. Directly geared to motor A is a bank of cooperating cams and switches shown diagrammatically in Figure 14, and indicated generally by letter K in Figure 5. It will be seen that the lobes of the cams, which bring about operation of the switches, are disposed at various points such that the corresponding switch is operated at the desired point in the course of one complete rotation of the cams. The gearing of motor A and discharge elevator E is such that the cams complete one full revolution each complete vacuum cycle; that is, the time between the discharge of a load of treated products from the vacuum zone and the completion of a further cycle when the next succeeding load of treated products is ready for discharge.

The synchronous function is brought about as follows. The cam K is provided with a plurality of lobes such that switch 73 controlling motor M (Fig. 3) is energized at intervals suitable to accommodate the continuous feeding of products into the turn-over chute 10. Each time normally open switch 73 is energized it causes motor M to bring about movement of feed elevator 13 so that the appropriate normally closed switches 73', 73'', 73''', make contact, thereby permitting travel of the elevator 13 to the next successive station, as seen in Figure 3. It will be understood that normally open switch 73 only makes contact for a brief period, sufficient to permit closure of the circuit through the appropriate parallel switch. This parallel circuit will then maintain the motor M in operation until the elevator reaches the next parallel switch when it will break the circuit and the elevator will remain stationary until motor M is subsequently reenergized by switch 73 and cam mechanism K. Since the cam and switch mechanism K is directly geared to the motor A, any speeding up or reduction in the rate of operation of the motor A and discharge elevator E will bring about an increased or decreased rate of operation of the feeding means from the turn-over chute 10.

Operation of the vacuum chamber doors is brought about, providing there is a source of supply through the lower contacts of relay 61, by closure of circuit through switch 74 (also shown in Fig. 5) whenever the elevator E reaches its top position; that is, when it is desired to receive a load of treated products from the vacuum zone. Closure of this circuit is of short duration, and as soon as door motor G functions to cause the doors to be operated by any conventional cam means within the mechanism T, rotating cam J causes switch J' (Figs. 13 and 5) to complete a parallel circuit to motor G, thereby permitting motor G to run until one complete revolution of the door operating means has been completed. At this point, the lobe on cam J will cause switch J' to interrupt the circuit. Since the elevator will now have descended sufficiently to interrupt circuit through switch 74, door motor G will stop in a predetermined position, ready for re-energization the next time the elevator reaches top position; that is, at the completion of one more operating cycle.

The conveyor belts and the tempering zone are similarly controlled. Cam 75', geared to motor A and shown in Figure 14, is arranged to cause switch 75 to make contact of short duration and thereby bring about energization of conveyor motor P. As soon as motor P starts, cam 77 (Fig. 5) rotates in fixed relationship with the conveyor belts, such that it permits current to pass direct from line L2 through switch 76 and continue operation of motor P until one movement of the pusher bars has been completed. At this point, the lobe of cam 77 (Fig. 5) causes interruption of circuit through switch 76 and the conveyor motor comes to rest. In the form shown, this may be regarded as the movement of the pusher bars which brings about movement of one set of separated groups onto the receiving trays 22, where they will remain until the completion of a vacuum cycle. Specifically, in the form shown, this motion occurs when the vacuum cycle is one-half complete. The second motion of the conveyor pusher bars is brought about by cam L and switch 78 (Fig. 5). Cam L is geared to the door operating mechanism in a manner similar to cam J. The lobe of cam L is so positioned that when the door operating cams are in rotation, in precise synchronization with the full opening of the charge doors 25, circuit is completed through switch 78 to motor P, thereby causing the conveyor pusher bars to move a second set of separated groups precisely at the time the gates of the receiving trays are opened by the downward movement of the charging doors 25. In this way, perfect synchronization is obtained. As previously, the contact through switch 78 is of short duration, sufficient to permit completion of a parallel circuit through switch 76, which itself becomes interrupted at the completion of one movement of the pusher bar, by means of cam 77 and as described for the previous movement.

In the form here disclosed, it will be seen that the feeding and distributing means driven by motor M operates to distribute a complete set of groups to the multiple flights twice during each vacuum cycle, and that the function of switches 75 and 78 cause these complete sets of groups to be moved through the tempering zone at time intervals exactly one half of the total vacuum cycle time.

As used herein, the term "set of groups" defines the combination of groups of segregated products arranged horizontally one above the other on the tempering paths, as delivered thereto by the feeding means and likewise as delivered simultaneously from the tempering paths to the vacuum zone.

It will therefore be seen that the functions synchronize themselves automatically, and are dependent upon the operation of motor A and its connected set of cams and switches K, as shown more fully in Figure 14. Stoppage of motor A prevents any of the other operations from continuing, since they cannot obtain the necessary energization of their initiating circuits except directly or indirectly through the rotation of switch mechanism K.

Thus, if a control failure occurs such that relay 61 becomes deenergized, motor A stops immediately, and this in turn brings about stoppage of all the other functions. Re-energization of control relay 61 cannot be brought about until the source of failure has been corrected, and main switch 60 then operated to reestablish the holding circuit to control relay 61. It will also be seen that when the control failure has been corrected, immediately motor A is re-energized, all the other functions will recommence in predetermined sequence and full synchronization.

For operating convenience, any number of conventional type switches 79 may be located at suitable points about the mechanism, such that motor A and its subsidiary functions may be stopped, temporarily, without disturbing the control circuit, and then recommenced whenever desired.

It will be understood that inclusion of discharge elevator E is not necessary to the function of these controls. In cases where this elevator is eliminated (see Fig. 5a) motor A merely operates rotating switch and cam mechanism K, and the function of switch 74 (Fig. 5) is replaced by locating this circuit on the bank of cams shown in Fig. 14. In all cases, the motor A is of the variable-speed type, to permit adjustment of the rate of synchronous operations over a reasonable range.

Referring to the operation of the vacuum controlling means, a rotating switch 80, also connected with the bank of switches K (Figs. 5, 8 and 14) is so set that it causes energization of any conventional type timing device 82, which in turn brings about energization of the normally closed suction valves 31', and small normally open release valve 33. The timing device 82 will maintain these three valves energized for a period of time corresponding to its setting, which may be varied over a desirable period for purposes of treating the products correctly. Switch 80 may also be used to bring about energization of medium normally open release valve 34. A second rotating switch 81 may also be used to bring about energization of large normally open release valve 35. The operation of these valves is as follows. Switches 80 and 81 are set to cause energization of the entire valve circuit immediately the doors of the vacuum zone are closed. Upon energization, the suction valves open to connect the vacuum pump with the vacuum pockets, and the release valves close, thereby closing off line 21. The vacuum pump thus induces vacuum within the vacuum zone for the period of time controlled by the timing device 82. At the expiration of this time, suction valves 31' close and disconnect the vacuum pump, and small release valve 33 opens, permitting slow release of vacuum through line 21 into the vacuum zone. Switch 80 is set so that it will break circuit a short time afterwards, thereby permitting medium release valve 34 to open and permit more rapid release of air into the vacuum zone. Switch 81 is so set that it will break contact and cause the large release valve 35 to permit flow of air into the vacuum pockets at a rapid rate in time to assure full release of vacuum prior to the time the doors of the vacuum zone are required to open. In this way, even though the timing device 82 were inadvertently set for too-long a duration, the independent circuit through switch 81 and large release valve 35 would prevent interruption of operations.

A further circuit is shown, to indicate to the operator in event the vacuum inducing means should fail, or if bread or other obstruction should become lodged in the vacuum doors, whereby proper vacuum treatment would not be effected. A normally closed vacuum switch 83 is placed in series with a rotating switch 84 (also operated by a cam as indicated in Fig. 14) and any suitable warning device 85. The cam which operates switch 84 is set so as to make contact approximately five or six seconds after the doors of the vacuum zone have closed if about eight to ten inches of vacuum have not been induced in that time. At such time a reasonable degree of vacuum should be induced within the vacuum zone, if the sealing of the doors and all other functions have taken place correctly. If initial vacuum has been correctly induced within the vacuum zone, normally closed vacuum switch 83 will have opened its contacts and there will be no circuit to cause energization of warning device 85. However, if failure to obtain initial vacuum has occurred, a circuit will be complete through switches 83 and 84 to warning device 85, and the operators will be thereby warned to seek the cause of trouble. I have not found it advisable to utilize a control for this purpose which would cause stoppage of the mechanism, as in the previous control circuits described, since the cause of trouble is usually of a minor nature and does not necessitate interruption of operations at the feeding end of the mechanism or other parts.

The strip heaters 45 are under the control of thermostat 45' which in turn operates the relay 86 to control the temperature of the wall surfaces of the vacuum chambers.

The crumb blowers 48 and 49 are controlled by rotating switches 48' and 49' to blow the crumbs from the door opening surfaces and vacuum chambers when the doors 25 and 26 are opening. That is, a blast of air is directed from the openings 50 upon the door sealing surfaces, as the doors open in their controlled sequence.

It will be understood that while all of the foregoing describes electro-mechanical means for adequately controlling the various steps of my method, the principles disclosed may be as readily applied to hydraulic or other means for carrying out any or all of the control steps.

I claim:

1. In the treatment of baked products for cooling and conditioning purposes continuously in a mechanical line, the continuous method which comprises separating the products at a single receiving point into groups of units and successively releasing the groups for distribution, then distributing the groups successively by transferring each group from the separating point, in rotation, to one of a plurality of independent paths of a tempering zone, carrying the groups through said zone along said paths and permitting moisture to travel to the surfaces of the units and reduce the temperature at said surfaces as the units travel through the zone, whereby the surfaces and adjacent surface zones of the baked units are softened and made moist and of lower temperature than their interiors defined by said zones, then transferring the tempered groups to a cooling zone and cooling the groups by vacuum treatment, the vacuum created in said zone being in excess of 28 inches of mercury, releasing the said vacuum initially at a relatively slow rate until the pressure has dropped to about between 20 to 26 inches of mercury, thereafter releasing the vacuum at a substantially unrestricted rate whereby pressure is permitted to build up within the products without undue stress being exerted upon the surfaces thereof, and discharging the products from the vacuum zone.

2. In the treatment of baked products for cooling and conditioning purposes continuously in a mechanical line, the method according to claim 1 wherein the wall surface of the vacuum zone is maintained at an elevated temperature to prevent accumulation of condensed moisture on the inner surface thereof.

3. In the treatment of baked products for cooling and conditioning purposes continuously in a mechanical line, the continuous method which comprises feeding the products at a single level with the products arranged in transverse rows, separating the products at a single receiving point into single transverse rows and successively releasing the rows for distribution, then distributing the rows successively by transferring each row from the separating point, in rotation, to one of a plurality of independent paths of a tempering zone, carrying the rows through said zone in the same direction along said paths and permitting moisture to travel to the surfaces of the products and reduce the temperature at said surfaces as the products travel through the zone, whereby the surfaces and adjacent surface zones of the baked products are softened and made moist and of lower temperature than their interiors defined by said zones, then transferring the tempered products to a cooling zone and cooling the products by vacuum treatment, the vacuum created in said zone being in excess of 28 inches of mercury, releasing said vacuum initially at a relatively slow rate until the pressure has dropped to about between 20 to 26 inches of mercury, thereafter releasing the vacuum at a substantially unrestricted rate whereby pressure is allowed to build up within the products without undue stress being exerted upon the surfaces thereof, discharging products from the vacuum treatment, and returning the products to a single level with the products in transverse rows.

4. In the treatment of baked products for cooling and conditioning purposes continuously in a mechanical line, the method according to claim 1 wherein each vacuum treatment is conducted upon multiple groups of units.

5. In the treatment of baked products for cooling and conditioning purposes continuously in a mechanical line, the method according to claim 1 wherein the vacuum cycle which is the total time required to charge the vacuum zone, creates a vacuum in excess of 28 inches of mercury and releases the same, and discharge of products from the vacuum zone is completed within a time period of not less than 1½ minutes, and wherein the duration of the vacuum cycle may be varied in accordance with the equation of $2(F \times P) = VC$ where F equals the number of paths in the tempering zone, P equals the interval between each release of the consecutive groups and VC equals the time of the vacuum cycle.

6. In the treatment of baked products for cooling and conditioning purposes continuously in a mechanical line according to claim 1 wherein, the vacuum cycle time, including the charging of tempered products, creation and release of vacuum and discharging of vacuum treated products, being twice that of the total time required to distribute a group to each of the multiple paths in the tempering zone.

7. In the treatment of baked products for cooling and conditioning purposes continuously in a mechanical line, the method according to claim 1 wherein air is discharged under pressure upon the sealing surfaces of the vacuum zone when the charging and discharging doors thereof are open.

8. In the treatment of baked products for cooling and conditioning purposes continuously in a mechanical line, the method according to claim 1 wherein the baked products are agitated in the vacuum zone as they are discharged therefrom.

9. In the treatment of baked products for cooling and conditioning purposes continuously in a mechanical line, the steps comprising carrying groups of products through a tempering zone along a plurality of independent paths and permitting moisture to travel to the surfaces of the products and reduce the temperature at said surfaces as the products travel through the zone whereby the surfaces and adjacent surface zones of the baked products are softened and made moist and of lower temperature than their interiors defined by said surface zones, then transferring the tempered groups to a cooling zone and cooling the groups by vacuum treatment, the vacuum created in said zone being in excess of 28 inches of mercury, releasing the said vacuum initially at a relatively slow rate until the pressure has dropped to about between 20 to 26 inches of mercury, thereafter releasing the vacuum at a substantially unrestricted rate whereby pressure is permitted to build up within the products without undue stress being exerted upon the surfaces thereof, and discharging the products from the vacuum zone.

10. In the treatment of baked products for cooling and conditioning purposes continuously in a mechanical line, the method according to claim 9 wherein the wall surface of the vacuum zone is maintained at an elevated temperature to prevent accumulation of condensed moisture on the inner face thereof.

11. In the treatment of baked products for cooling and conditioning purposes continuously in a mechanical line, the method according to claim 9 wherein each vacuum treatment is conducted upon multiple groups of baked products.

12. In the treatment of baked products for cooling and conditioning purposes continuously in a mechanical line, the method according to claim 9 wherein air is discharged under pressure upon the sealing surfaces of the vacuum zone when the charging and discharging doors thereof are open.

13. In the treatment of baked products for cooling and conditioning purposes continuously in a mechanical line, the method according to claim 9 wherein the baked products are agitated in the vacuum zone as they are discharged therefrom.

14. In an apparatus for the conditioning and cooling of baked products comprising a tempering chamber, conveying mechanism for moving hot bakery products through said chamber while being tempered therein, a vacuum chamber for receiving tempered products, said vacuum chamber having a charging and a discharging door, said doors being movable to charging and discharging positions, means for operating said conveying mechanism, means for opening and closing the said doors of the vacuum chamber, the door-operating means being operable to successively open and close said discharging doors and said charging doors, separate and independent motive drive means for the door-operating and conveyor-operating means, and sequential control means for the separate and independent drive means, said sequential control means being separately connected to each of said drive means for intermittently operating said drive means in sequential timed relationship.

15. In an apparatus according to claim 14, indicating means connected to said sequential control means and operable in the event a certain degree of vacuum is not induced within the vacuum chamber in a predetermined time after the doors of the vacuum chamber have closed.

16. In an apparatus according to claim 14 wherein the conveyor mechanism includes a plurality of independent paths, and means for operating said doors, means automatically actuated by the door-operating means to cause the conveyor mechanism to move as the charging door operating means is actuated whereby the vacuum chamber receives products from the tempering paths at substantially the same time as the opening of the charging doors.

17. In an apparatus according to claim 14, means for creating and releasing vacuum in said vacuum chamber, said releasing means including a valve structure the opening of which may be gradually increased, and means for gradually opening the valve structure while said doors are closed at the completion of the operation of the vacuum-creating means.

18. In an apparatus for the conditioning and cooling of baked products according to claim 14 wherein said sequential control means is arranged to operate said conveying mechanism at least twice for each single operation of the door-operating means.

19. In an apparatus for the conditioning and cooling of baked products according to claim 14 wherein said sequential control means is arranged to operate said conveying mechanism at least twice for each single operation of the door-operating means and to operate said conveying mechanism in one of its movements substantially at the same time as said charging door is opened.

20. In an apparatus of the class described comprising a tempering and cooling chamber, said chamber comprising a multiplicity of separate superposed paths, conveying mechanism for moving hot bakery products through said chamber along said paths in the same direction, a feeding and distributing means, means for supplying products to said last means at a single level with the products disposed in a transverse row, means for operating said feeding and distributing means to supply said products in single transverse rows to the several separate paths of the tempering chamber, means for actuating the conveying mechanism to cause the products to move through the chamber in the same direction away from the feeding and distributing means, sequential timing means intermittently controlling the operation of said conveyor-actuating means, said timing means also intermittently operating said feeding and distributing operating means in alternate sequence of movement whereby to operate said conveyor-actuating means after each operation of the feeding and distributing means to supply products to the conveying mechanism so that the products are placed upon the conveyor in spaced groups and the conveyor has space adjacent the feeding and distributing means to receive the next feed of products therefrom and carry same through the tempering chamber, and means for receiving products which have been processed in said tempering and cooling chamber, and means operated by said sequential timing means for returning the products to a single level with the products in a single transverse row.

MONTAGUE H. DUVAL.

References Cited in the file of this patent

UNITED STATES PATENTS

| Number | Name | Date |
|---|---|---|
| 709,966 | Curtiss | Sept. 30, 1902 |
| 1,288,116 | Moore | Dec. 17, 1918 |
| 1,802,205 | Fox et al. | Apr. 21, 1931 |
| 1,899,154 | Karrick | Feb. 28, 1933 |
| 1,901,115 | Muller | Mar. 14, 1933 |
| 1,904,613 | Braren | Apr. 18, 1933 |
| 2,072,737 | Duval | Mar. 2, 1937 |
| 2,075,012 | Baker | Mar. 30, 1937 |
| 2,114,595 | Fennema | Apr. 19, 1938 |
| 2,171,921 | Duval et al. | Sept. 5, 1939 |
| 2,171,922 | Duval et al. | Sept. 5, 1939 |
| 2,175,541 | Probert | Oct. 10, 1939 |
| 2,362,117 | David | Nov. 7, 1944 |